Jan. 6, 1925.

J. C. HIGHTOWER 1,522,057

MACHINE FOR CUTTING STONE

Filed Nov. 1, 1923   3 Sheets-Sheet 3

Witnesses;

Inventor:
J. C. Hightower.

by Munn &Co
Attys.

Patented Jan. 6, 1925.

1,522,057

UNITED STATES PATENT OFFICE.

JIM C. HIGHTOWER, OF COLLEGE PARK, GEORGIA.

MACHINE FOR CUTTING STONE.

Application filed November 1, 1923. Serial No. 672,168.

*To all whom it may concern:*

Be it known that I, JIM C. HIGHTOWER, a citizen of the United States, and a resident of College Park, in the county of Fulton and State of Georgia, have invented certain new and useful Improvements in Machines for Cutting Stone, of which the following is a specification.

My present invention relates generally to stone cutting machines of that nature commonly known as stone sawing machines, in which some form of cutter, single or gang, operates to cut through blocks of stone by and with the assistance of steel shot and water continuously pumped onto the stone to be cut so as to run into the grooves formed by the cutter.

The primary object of my invention is the provision of a quick cutting apparatus having cutters in the form of shafts and embodying means for rotating these cutter shafts as well as means whereby the shafts are at the same time given an axial movement whereby in their constant reciprocation during rotation the stone cutting shot as used in practice will be evenly distributed and a speedy uniform cutting operation will result.

Various other objects as well as the resulting advantages of my present invention will appear in the course of the following description, in which reference is made to the accompanying drawings forming a part of this specification and illustrating my invention with the exception of the well known means for constantly feeding the stone cutting shot upon the surface of the stone being cut.

Figure 1:
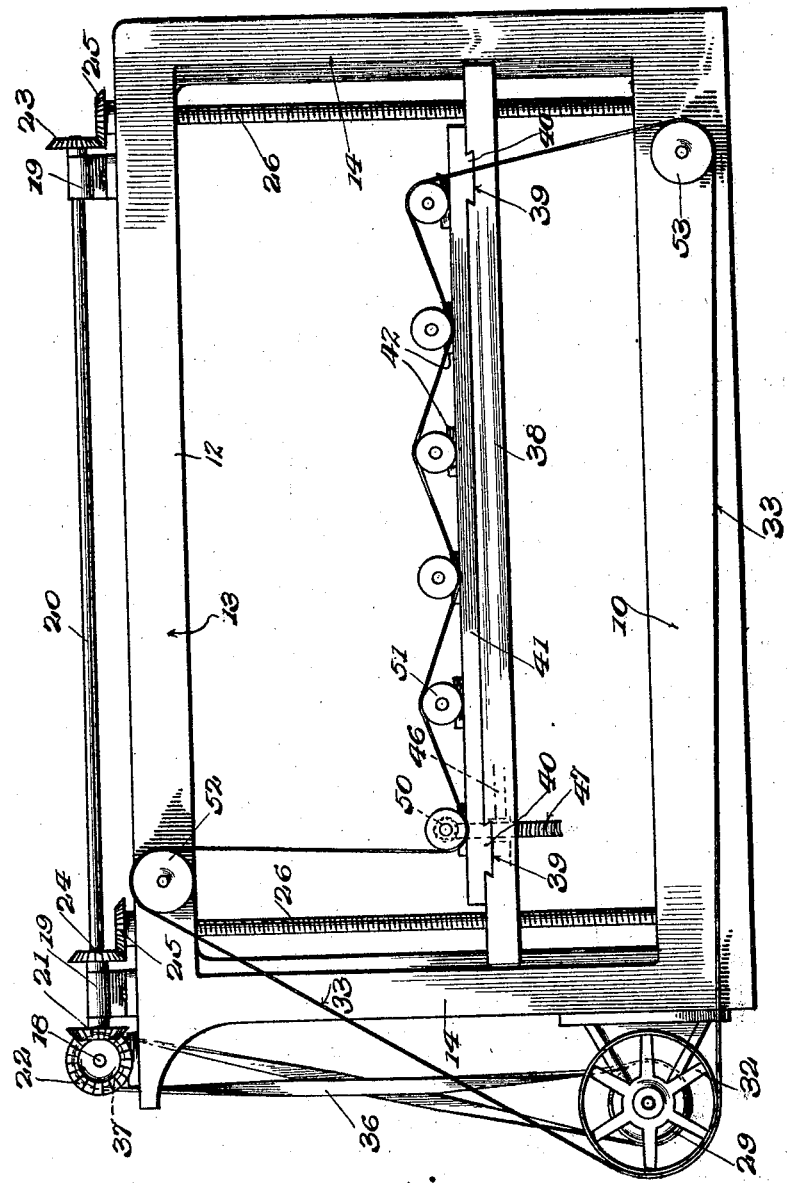
Figure 1 is a side elevation of my improved machine.

Referring now to these figures my invention proposes a machine including a solid base 10 on which tracks may be laid in use for the movement of trucks bearing the blocks of stone to be cut, it being usual to run such trucks beneath the cutters and clamp the same so as to hold the stone slab stationary during the cutting operation.

From the base or foundation 10 rise spaced parallel side frames 11 and 12, each side frame including an upper longitudinal beam 13 and end uprights 14 of which the uprights 14 at one end support lower bearings 15 for a lower main shaft 16, and upper bearings 17 for an upper cross shaft 18.

The upper longitudinal beams 13 also support bearings 19 for upper longitudinal shafts 20 having at one end bevel gears 21 in engagement with bevel gears 22 at the ends of the upper cross shaft 18. At their opposite ends the longitudinal shafts 20 have bevel gears 23 and these shafts are also provided with bevel gears 24 spaced from their beforementioned bevel gears 21 and which like the bevel gears 23 engage bevel gears 25 at the upper ends of vertical screw shafts 26.

The main shaft 16 may be driven from any suitable source of power either through gears or by means of a belt extending around a pulley 27 at one end of the shaft, this shaft being provided with a loose stepped pulley 28 and a loose single pulley 29 between the side frames 11 and 12 respectively controlled by clutches including clutch levers 30 and 31.

The main shaft 16 is also provided at one end with a pulley 32 around which a belt 33 extends for a purpose which will be presently made plain, the stepped pulley 28 of the shaft being connected by an upright belt 34 with a stepped pulley 35 fixed upon the upper cross shaft 18. The single pulley 29 is likewise connected by an upright belt 36 with a single fixed pulley 37 on the upper cross shaft 18 and it will be noted that belt 36 is crossed so that the rotation of the upper cross shaft 18 may thus be reversed.

Figure 2:
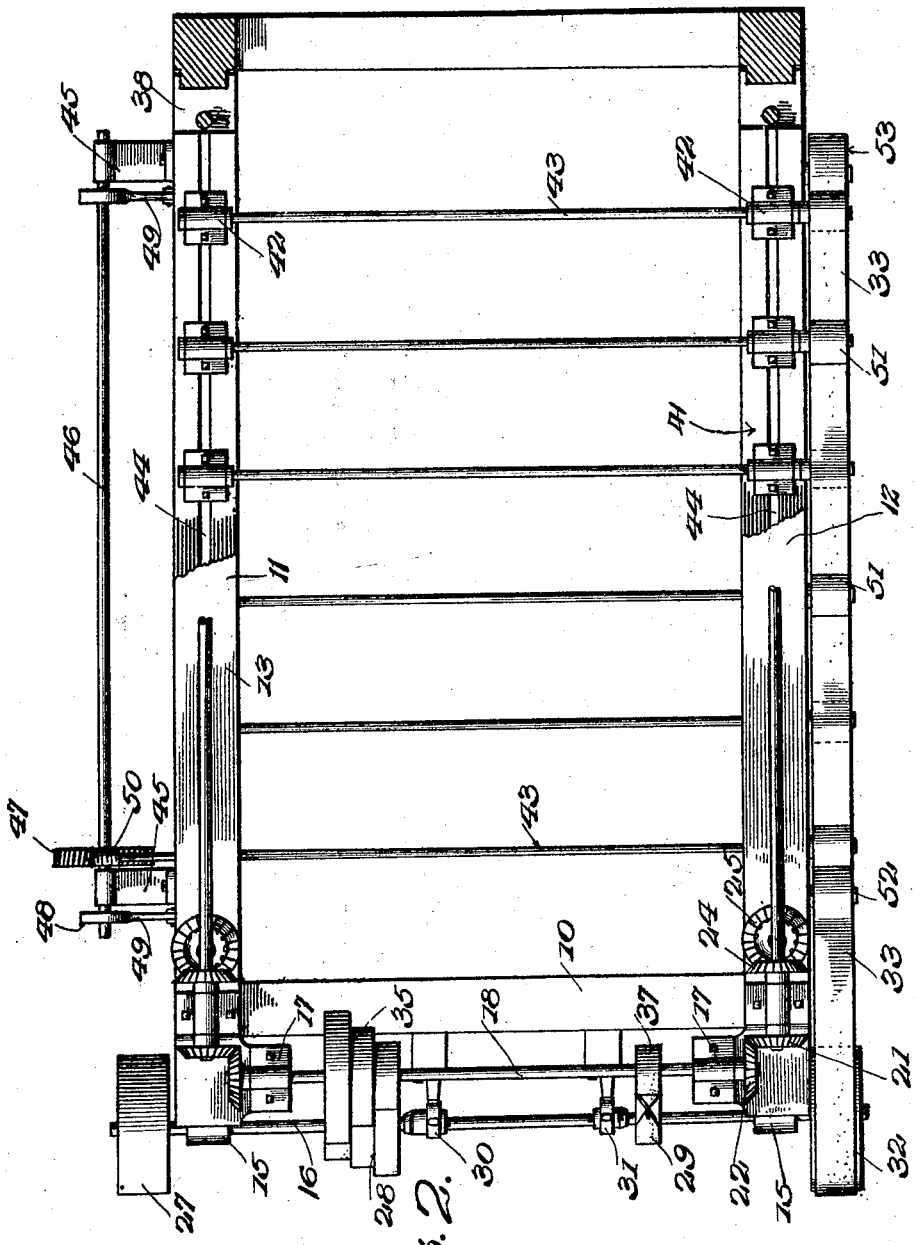
Figure 2 is a top plan view thereof partly broken away and in section.
Figure 3:
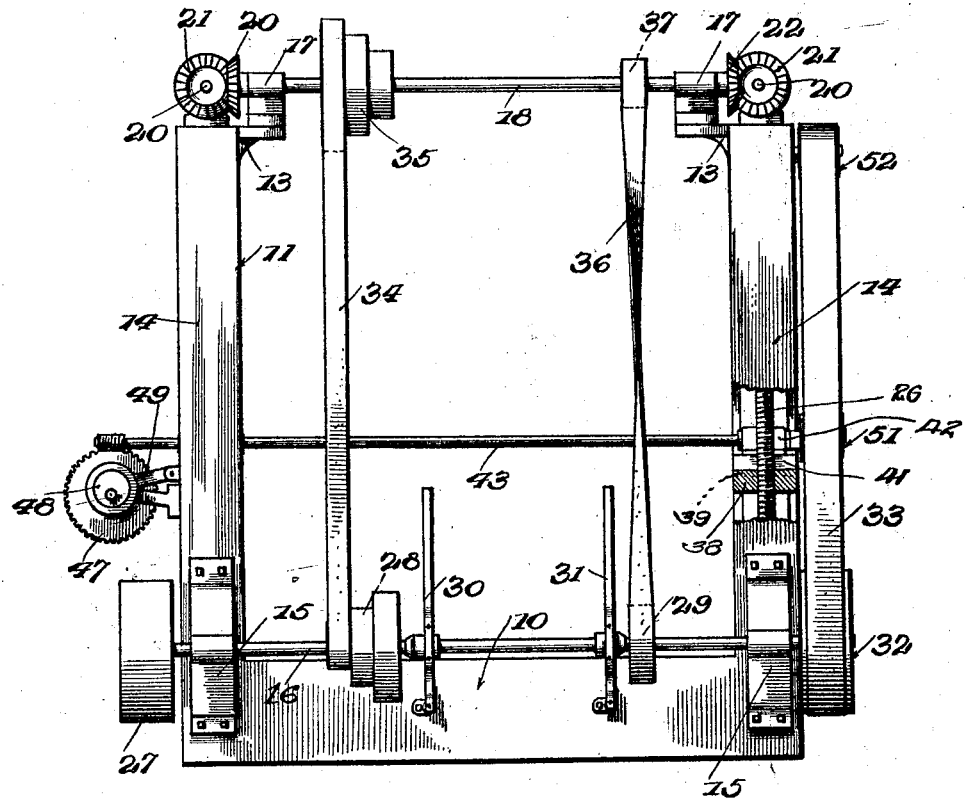
Figure 3 is an end view.

The screw shafts 26 beforementioned are threaded through the longitudinal side beams 38 which together with certain other parts form the cutter frame, the ends of which beams 38 slidably engage the uprights 14 of the side frames 11 and 12 in such manner as to prevent lateral displacement of the beams. These beams 38 are moreover provided adjacent to their opposite ends with transverse dovetail grooves 39 receiving the lower transverse dovetail ribs 40 of a pair of slide plates 41 extending along and superposed upon the beams 38 and in turn supporting the bearings 42 for the opposite ends of the cutter shafts 43. These bearings 42 are preferably adjustable along the slide plates 41 for which purpose they may be clamped within lengthwise grooves 44 of the slide plates shown in Figure 2, and the cutter shafts 43 while rotatable within the bearings 42 are held thereby against independent endwise movement.

At one side of the machine, the adjacent side beam 38 supports laterally outstanding bearings 45 for the ends of an eccentric shaft 46 having thereon a worm wheel 47 and a pair of eccentrics 48, each eccentric being connected by an eccentric strap and arm 49 to the adjacent slide plate 41. Moreover one of the cutter shafts 43 is extended at one end and provided with a worm 50 splined thereon and engaging the worm wheel 47 so that during rotation of the cutter shafts the eccentric shaft 46 will be rotated and through its eccentric connection with the adjacent slide plate 41 the series of cutter shafts 43 rotatably supported in the bearings 42 carried by the slide plate, will be continuously shifted axially back and forth.

At one end the series of cutter shafts 43 are extended laterally beyond the adjacent slide plate 41 and each of these extended portions of the shafts has a pulley 51 engaged by the belt 33 beforementioned. This belt extends from its driving pulley 11 around an upper guide pulley 52 supported by the upper beam 13 of the adjacent side frame and thence downwardly throughout the series of cutter shaft pulleys along which it is extended alternately beneath and over the pulleys. After passing through the series of cutter shaft pulleys the belt 33 extends downwardly and back to its driving pulley 11 around a lower guide pulley 53 supported by one side of the base or foundation 10 and it is obvious in this way that the belt 33 will efficiently operate to continuously rotate the cutter shaft and at the same time allow for the movement of the cutter shafts as a series with the cutter frame in its up and down movements actuated by the screw shafts 26 as well as for the lengthwise reciprocation of the shafts with the lateral movement of the slide plates, it being noted that this latter movement, actuated by the eccentrics, is short and well within the widths of the shaft pulleys and the belt 33.

In operation, after the stone to be cut or sawed is moved into the frame of the machine upon the base or platform 10 and between the upright sides of the frame at one end, and after the same has been properly positioned beneath the cutter frame and secured in position, the clutch lever 30 is actuated to engage the pulley 28 with the driven shaft 16 and the lowering movement of the cutter frame then commences in view of the rotation of the screw shafts 26 through the connections previously described including the upper cross shaft 18 and the upper longitudinal shafts 20. At the same time the several cutter shafts are in rotation through the belt 33 and are continuously moved in the direction of their length, this reciprocation being brought about by virtue of the eccentric shaft 46 with its eccentric connections to the slide plates 41 supporting the bearings of the several cutter shafts.

Thus as the cutter frame descends, the movements of the cutter shafts efficiently coact with the steel shot commonly used, the cutter shafts revolving at a high rate of speed so as to draw the steel shot under them in their action on the stone to be cut. At the same time the cross motion or reciprocation of these shafts materially speeds up the cutting operation and insures even uniform disposition of the shot.

In this operation and by virtue of the stepped pulleys 28 and 35 it is obvious the speed of movement of the cutter frame in a downward direction may be controlled in accordance with the character of the stone being cut, it being contemplated that the cutter frame will move downwardly at a greater rate of speed through soft stone than through hard stone all within the skill and experience of the operator.

After the stone has been completely cut through, the clutch lever 30 is moved to release the clutch of the stepped pulley 28 so that further downward movement of the cutter frame is checked, and the operator then moves the clutch lever 31 so as to clutch the single pulley 29 and in this way reverse the movement of the cutter frame actuating connections so as to move the cutter frame upwardly to a point where the cut stone may be removed and another stone brought into the frame of the machine for a subsequent cutting operation.

My improved machine for the above purposes is simple and comparatively inexpensive when material increase in speed and efficiency of operation is taken into consideration, and my improved machine is singularly free from weak or delicate parts and will be strong and durable as a whole in use.

I claim:

1. A stone cutting or sawing machine including a main frame having a pair of side upright portions including vertical guides and open at one end for the introduction of stone to be cut, a cutter frame within the main frame including horizontal side beams having their ends adjustably engaging said main frame guides, slide plates transversely shiftable upon and carried by the said beams the beams and slide plates having cooperating guide means, and cutter shafts having bearing on said slide plates, said cutter shafts being shiftable in the direction of their lengths with the slide plates and adjustable vertically along with the slide plates and the said beams, said cutter shafts having extending portions at one end provided with pulleys, a driven shaft journaled in the main frame and having a pulley, guide pulleys mounted in the upper and lower portions of one side of the main frame beyond opposite ends of the series of cutter shaft pulleys, a belt extending around said driven and guide pulleys and having its portion between the guide pulleys extended alternately over and under the cutter shaft pulleys, and connections between one of said cutter shafts and one of the slide plates whereby to shift the latter during rotation of the cutter shaft.

2. A stone cutting or sawing machine including a main frame having a pair of side upright portions including vertical guides and open at one end for the introduction of stone to be cut, a cutter frame within the main frame including side beams adjustably engaging said main frame guides, slide plates transversely shiftable upon and carried by the said beams, and cutter shafts having bearing on said slide plates, said slide plates and beams having cooperating guides and said cutter shafts being shiftable in the direction of their lengths with the slide plates and movable vertically along with the slide plates and the said beams, said cutter shafts having extending portions at one end provided with pulleys, a driven shaft journaled in the main frame and having a pulley, guide pulleys mounted in the upper and lower portions of one side of the main frame beyond opposite ends of the series of cutter shaft pulleys, a belt extending around said driven and guide pulleys and having its portion between the guide pulleys extended alternately over and under the cutter shaft pulleys, a side shaft journaled lengthwise along one of said cutter frame beams and having eccentric connections with one of the slide plates, and gearing connections between one of the cutter shafts and the said side shaft for rotating the latter whereby to shift the slide plates and reciprocate the cutter shafts during their rotation.

3. A stone cutting or sawing machine including a main frame having vertical guides, a cutter frame including parallel side beams the ends of which slidably engage said guides, slide plates shiftable upon and transversely with respect to the said beams and having adjustable bearing members therealong, said slide plates and said beams having coacting guide ribs and recesses, cutter shafts mounted in said bearings to shift lengthwise with lateral shifting movement of the slide plates and also adjustable vertically with said beams, means for rotating the cutter shafts in their bearings during their vertical movement and lengthwise reciprocation, and means in the main frame engaging the said beams for adjusting the latter vertically as described.

JIM C. HIGHTOWER.